United States Patent [19]
Mazza

[11] 3,765,318
[45] Oct. 16, 1973

[54] DEVICE FOR THE PRODUCTION OF CARBONATED BEVERAGES

[75] Inventor: Lamberto Mazza, Pordenone, Italy

[73] Assignee: Industrie A. Zanussi S.p.A., Pardenone, Italy

[22] Filed: Jan. 25, 1972

[21] Appl. No.: 220,581

[30] Foreign Application Priority Data
Feb. 24, 1971  Italy .............................. 20986 A/71

[52] U.S. Cl. ................................................. 99/275
[51] Int. Cl. ................................................. A23l 1/00
[58] Field of Search ...................... 99/275, 276, 277, 99/277.1, 277.2, 28

[56] References Cited
UNITED STATES PATENTS

| | | | |
|---|---|---|---|
| 3,256,802 | 6/1966 | Karr | 99/275 |
| 2,770,544 | 11/1956 | Johnson | 99/275 |
| 3,634,107 | 1/1972 | Cornelius | 99/275 |
| 3,393,631 | 7/1968 | Harrison | 99/275 |

Primary Examiner—Robert W. Jenkins
Attorney—John C. Holman et al.

[57] ABSTRACT

A device for the production of carbonated beverages, particularly carbonated water, is disclosed, wherein two separate feed ducts are provided for the water to be carbonated and for the carbon dioxide respectively, these ducts merging into an outlet duct so that the feed duct of the carbon dioxide is axially inserted in the water feed duct, two independent pressure controls being provided in the carbon dioxide and in the outlet duct respectively, whereby a very good turbulent mixing motion is established downstream of the merging section.

4 Claims, 3 Drawing Figures

DEVICE FOR THE PRODUCTION OF CARBONATED BEVERAGES

BACKGROUND OF THE INVENTION

The present invention concerns a device for the production of carbonated beverages, particularly of carbonated water.

The main purpose of the invention is the realization of a device for the production of carbonated beverages, in which a very good mixing of the beverage with the added carbon dioxide can be obtained.

Another purpose of the invention is the realization of a device for the production of carbonated beverages, allowing a wide and nearly continuous adjustment of the carbonation ratio, i.e. of the ratio of the quantity of carbon dioxide to the quantity of noncarbonated beverage with respect to a volume unit of the carbonated beverage.

SUMMARY OF THE INVENTION

In order to accomplish the above purposes, a device is provided according to the invention, the most important feature of which is that the outlet of the carbon dioxide feed duct is axially inserted in the feed duct of the noncarbonated beverage.

A further feature of the device according to this invention is the arrangement of a mixing unit downstream of the connection of the two feed ducts of the carbon dioxide and of the noncarbonated beverage, the mixing unit consisting of a tortuous capillary tube, so as to produce a turbulent motion in the mixture.

Still another feature of the device according to this invention is the insertion of two independently adjustable pressure controls, respectively in the feed duct of the carbon dioxide and in the duct of the carbonated beverage, downstream of the mixing unit.

The axial injection of the carbon dioxide in the noncarbonated beverage and the presence of the mixing unit producing turbulent motion, are conducive to a very good mixing of the two components, whereas the presence of two independently adjustable pressure controls makes it possible, by changing the setting either of one or of both of them, to widely and continuously vary the carbonation ratio of the finished product. In order to obtain still higher mixing, it is possible to feed the noncarbonated beverage at a low temperature or to refrigerate the beverage during the mixing operation, by immersing the mixing unit in a suitable coolant (it is well known that the diffusion of the carbon dioxide in the beverage will be enhanced at low temperatures).

BRIEF DESCRIPTION OF THE DRAWINGS

The features of this invention, as well as the advantages thereof will be better understood upon considering the following detailed description of an embodiment of the present invention. In this detailed description, which should in no way be construed as limiting, reference will be made to the accompanying drawings in which.

DETAILED DESCRIPTION OF A PREFERRED EMBODIMENT

Figure 1:
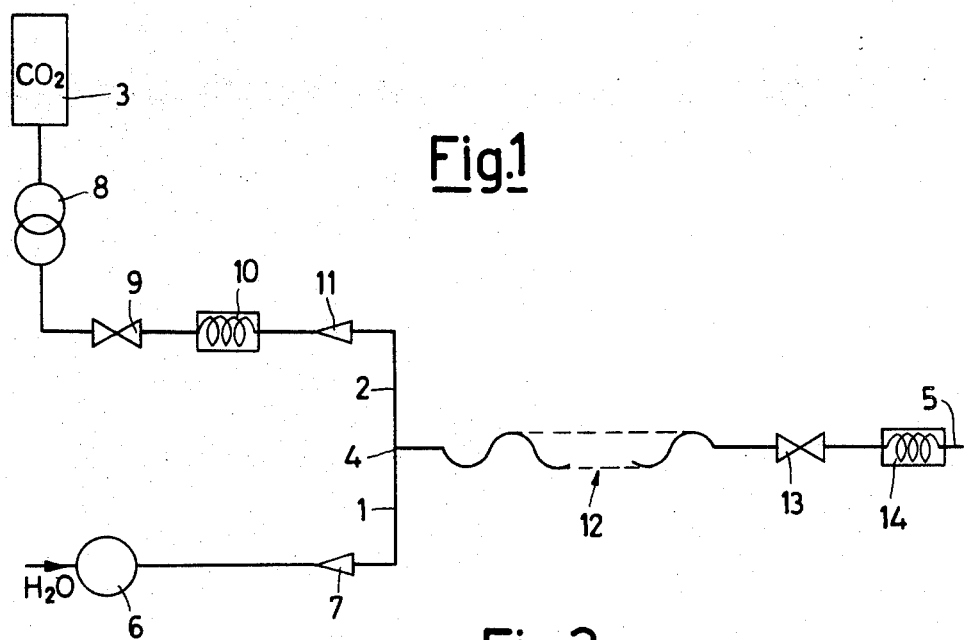
FIG. 1 shows the general arrangement of a device according to the invention, for the production of carbonated water.

As can be seen from FIG. 1 the device essentially comprises a duct 1 through which the noncarbonated water is fed and a feed duct 2 for the carbon dioxide (delivered from the container 3), which merge together at the point 4 forming a duct 5 through which the carbonate water resulting from the mixing of the two components flows. In the duct 1 a pump 6 (not necessary if the water is delivered from a pressure container) and a check valve 7 are provided; in the duct 2 a pressure reducing and control device 8, a manually operated cut off valve 9, a solenoid valve 10 and a check valve 11 are provided. In the duct 5 the mixing unit 12, consisting of a 90° bent tortuous capillary tube, in this case helix-shaped, a valve 13 controlling the output pressure of the carbonated water and a solenoid valve 14, synchronously operated with respect to the solenoid valve 10 are provided.

Figure 2:
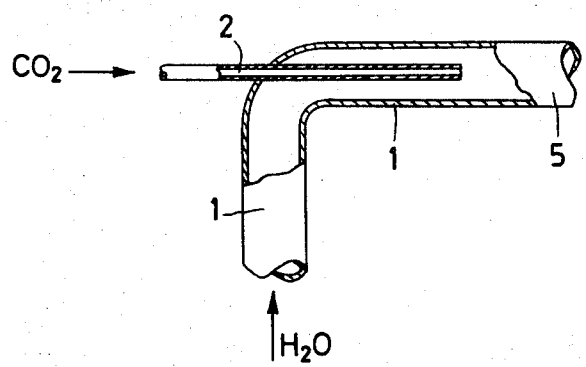
FIG. 2 shows the construction details of the connection of the feed ducts of the carbon dioxide and of the noncarbonated water.

The connection 4 of the ducts 1 and 2 is preferably realized as shown in FIG. 2, i.e. with a 90° bend in the duct 1, which is fixedly secured to the duct 5 and with the duct 2 (capillary) axially inserted in the horizontal end part of duct 1. The axial inlet, together with the special winding shape of the mixing unit 12, leads to an excellent mixing of the carbon dioxide with the noncarbonated water. An even better mixing can be obtained by feeding the noncarbonated water at low temperature into the device or by immersing the mixing unit 12 in a suitable heat exchanger, e.g. in a vessel filled with water and containing the evaporator of a refrigerating system.

Figure 3:
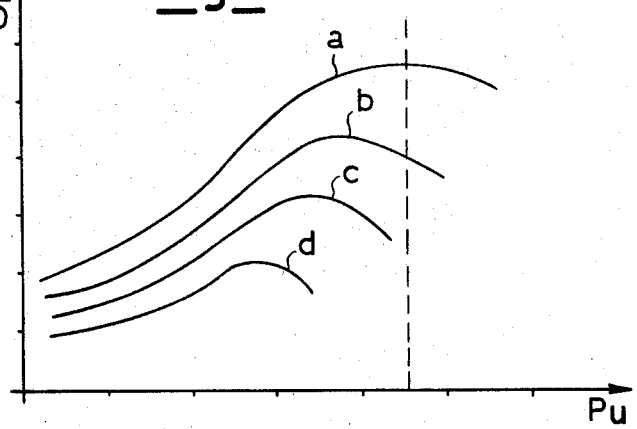
FIG. 3 shows a graph in which the carbonation ratios are plotted against the values of the pressure of the carbon dioxide and of the water determined by the two independently adjustable pressure controls.

In order to control the carbonation ratio, i.e. the ratio of $\phi = CO_2/H_2O$ of the quantity of carbon dioxide to the quantity of noncarbonated water per volume unit of carbonated water produced, at least one of the two pressure controls 8 and 13 must be adjusted. Different settings of the control 8 (with the setting of the control 13 left unchanged) lead to a series of curves as those indicated by $a$, $b$, $c$, $d$, in FIG. 3, whereas different settings of the control 13 ($P_u$) permit the carbonation ratio to vary along one of the curves determined by the setting of the control 8 (i.e. at constant pressure of the carbon dioxide).

What we claim is:

1. A device for the production of carbonated beverages, from a source of noncarbonated liquid and a source of carbon dioxide, said device comprising a first feed duct means communicating with said carbon dioxide source and carrying carbon dioxide therein to an outlet thereof; a second feed duct means coupled to said noncarbonated liquid source and carrying the noncarbonated liquid therein; said first feed duct means being axially inserted into and communicating with the interior of said second feed duct means, the outlet location of said first feed duct means within the interior of said second feed duct means defining an intermixing point for the carbon dioxide and noncarbonated liquid; mixing means disposed downstream of said intermixing point for generating turbulent motion in the mixture of carbon dioxide and noncarbonated liquid; and output means for delivering the carbonated beverage from said mixing means.

2. A device as claimed in claim 1 wherein said mixing means is a tortuous capillary tube.

3. A device according to claim 2, wherein said mixing means is contained within a cooler.

4. A device as claimed in claim 3 wherein said first duct means has a first pressure control means mounted thereon, and said output means has a second pressure control means mounted thereon, said first and second pressure control means being independently adjustable.

* * * * *